United States Patent [19]

Wakley et al.

[11] Patent Number: 4,964,994
[45] Date of Patent: Oct. 23, 1990

[54] HYDROCYCLONE SEPARATOR

[75] Inventors: William D. Wakley, Broken Arrow; J. Robert Worrell; Grant A. Young, both of Tulsa, all of Okla.

[73] Assignee: Amoco Corporation, Chicago, Ill.

[21] Appl. No.: 326,719

[22] Filed: Mar. 21, 1989

[51] Int. Cl.$^5$ .............................................. B04C 3/00
[52] U.S. Cl. .................................. 210/512.1; 55/459.1; 209/211; 209/144
[58] Field of Search ...................... 55/459.1–459.5; 209/211, 144; 210/512.1, 512.2, 512.3

[56] References Cited

U.S. PATENT DOCUMENTS

| | | | |
|---|---|---|---|
| 2,377,524 | 6/1945 | Samson et al. | 210/512.1 |
| 3,428,175 | 2/1969 | Hukki | 209/211 |
| 4,564,443 | 1/1986 | Bliss | 210/512.1 |
| 4,576,724 | 3/1986 | Colman et al. | 210/512.1 |
| 4,721,565 | 1/1988 | Carroll | 209/211 |
| 4,749,490 | 6/1988 | Smyth et al. | 209/144 |
| 4,793,924 | 12/1988 | Colman et al. | 210/512.1 |
| 4,876,016 | 10/1989 | Young et al. | 210/512.1 |

OTHER PUBLICATIONS

PCT publication WO88/03842, publication date 6-1988, Prendergast et al., Title: Hydrocyclones.
Tiederman et al., Conference publication, "Experimental Design of Hydrocyclones for the Clarification of Waste Water", Jun. 20-22, 1973, pp. 40-46.
Herkenhoff, article from Mining Engineering Publication, 8-1957 Edition, pp. 873-876, "Selecting A Cyclone For Wet Classification".

Primary Examiner—Frank Spear
Assistant Examiner—Joseph Drodge
Attorney, Agent, or Firm—Scott H. Brown; Fred E. Hook

[57] ABSTRACT

A hydrocyclone separator for separating oil from water includes a substantially cylindrical first portion with a central overflow outlet and at least one tangential flow inlet, an essentially single angled conical second portion, and a substantially cylindrical third portion, with a central underflow outlet. The hydrocyclone separator is made in accordance with the following relationships:

$$do < du < Dc$$

$$0.1 \leq di/Dc \leq 0.4$$

$$0.01 \leq do/Dc \leq 0.06$$

$$0 \leq Lc/Dc \simeq 2.0$$

$$3° \leq \alpha \leq 30°$$

$$0.1 \leq du/Dc \leq 0.5$$

$$9 \leq Ls/Dc.$$

8 Claims, 8 Drawing Sheets

HYDROCYCLONE SEPARATOR

Background of the Invention

1. Field of the Invention

The present invention relates to hydrocyclone separators used for separating two fluid phases and, more particularly, to hydrocyclone separators having specific component size ratios to improve oil from water separation efficiency.

2. Setting of the Invention

Numerous designs of hydrocyclone separators have been developed and utilized in the production of hydrocarbons from subterranean formations. Hydrocyclone separators are being utilized in more applications in hydrocarbon production due to increased environmental concerns regarding the discharge of oil with produced water into bodies of water. Various government regulations have placed severe restrictions on the quantity of oil to be discharged into the ocean, for example, in the North Sea, the discharge limit of oil with produced water currently is 48 mg/l. In order to meet such stringent oil discharge requirements, more efficient hydrocyclone separator designs need to be developed. Numerous research entities have conducted tests to find criticalities of the ratios of components sizing to produce more efficient hydrocyclone separators. Examples of hydrocyclone separators with critical design ratios are disclosed in the following patents: U.S. Pat. No. 4,237,006, U.S. Pat. No. 4,251,368, U.S. Pat. No. 4,544,486, U.S. Pat. No. 4,576,724, U.S. Pat. No. 4,464,264 and U.S. Pat. No. 4,683,061.

The above-described patents disclose hydrocyclone separators that are useful for separation of small quantities of oil from large streams of discharged water; however, it has been found that hydrocyclone separators made in accordance with one or more of these patents require multiple angles and multiple cylindrical portions which add to the complexity of manufacture of the hydrocyclone separator and thus increase the cost. Further, there is a need for a hydrocyclone separator design which has improved separation efficiency to meet the ever increasing governmental environmental regulations.

SUMMARY OF THE INVENTION

The present invention has been developed to overcome the foregoing deficiencies and meet the above described needs. One embodiment of a hydrocyclone separator of the present invention has a substantially cylindrical first portion with a central overflow outlet and at least one tangential flow inlet adjacent a first end thereof. The cylindrical first portion converges into a conical second portion which in turn converges into a substantially cylindrical third portion, which has a central underflow outlet at an opposite end.

Through experimentation, it has been found that if a hydrocyclone separator is designed to have a configuration within the ranges described herein, it can be easily and inexpensively constructed, and it will exhibit oil from water separation efficiency exceeding that of the hydrocyclone separators currently available on the commercial market.

The desired configuration of the hydrocyclone separator is as follows:

$$do < du < Dc$$

$$0.1 \leq di/Dc \leq 0.04$$

$$0.01 \leq do/Dc \leq 0.06$$

$$0 \leq Lc/LcDc \leq 2.0$$

$$3 \leq \alpha \leq 30$$

$$0.1 \leq du/Dc \leq 0.5$$

$$9 \leq Ls/Dc.$$

The internal diameter of the cylindrical first portion is Dc, the diameter of a circle which has the same area as the flow inlet, regardless of shape, is di, the internal diameter of the overflow outlet is do, the internal length of the cylindrical first portion is Lc, the cone angle of the second portion is $\alpha$, the internal length of the cylindrical third portion is Ls, and the internal diameter of the underflow outlet is du.

DETAILED DESCRIPTION OF THE PREFERRED EMBODIMENTS

In the utilization of hydrocyclone separators, the engineer is usually given the produced oil concentration and the oil/water stream's production flow rate. From that point, the engineer determines the size and number of hydrocyclone separators needed to achieve maximum oil separation efficiency. In an offshore platform environment, the flow rates per hydrocyclone are usually between about 10 and about 100 gpm (gallons-per-minute). For the purposes of the following discussion, the performance of the hydrocyclone separators of the present invention will be described in relation to this range of flow rates. However, it should be understood that flow rates less than or greater than this range can easily be accommodated.

Figure 1:
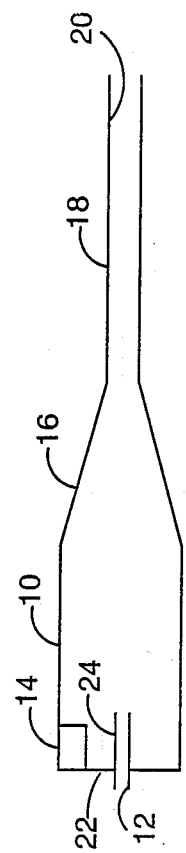
FIG. 1 is a cross-sectional side view of a hydrocyclone separator designed in accordance with the present invention.

As shown in FIG. 1, a hydrocyclone separator of the present invention can include a substantially cylindrical first portion 10 having a central overflow outlet 12 at a first end thereof, and has at least one tangential flow inlet 14 adjacent the first end thereof. A second end of the substantially cylindrical first portion 19 converges into a conical second portion 16 which in turn converges into a substantially cylindrical third portion 18, which has a central, oppositely located underflow outlet 20. The cylindrical first portion 10 is necessary, and the overflow outlet 12 and flow inlet(s) 14 can be provided in the conical second portion 16, as is well known. The hydrocyclone separator can be assembled from multiple separate parts that are bolted, clamped, welded, braised, glued together or the like to form a single hydrocyclone separator. Preferably, the hydrocyclone separator is molded as a single unit from PVC, polyurethane or other similar material. Further, the hydrocyclone separator can be a rigid, self-supporting unit or can be contained within a substantially cylindrical shell (not shown) for protection of the molded components.

For ease of understanding of the relationships between the various components and sizing, the following labels are used. The internal diameter of the cylindrical first portion 10 is labeled Dc, the diameter of a circle having the same area as the flow inlet(s), regardless of shape, is labeled di, the internal diameter of the overflow cylindrical first portion 10 is labeled Lc, the cone angle of the conical second portion 16 is labeled $\alpha$, the internal length of the cylindrical third portion 18 is labeled Ls, and the internal diameter of the underflow outlet 20 is labeled du.

The at least one tangential flow inlet 14 introduces the oil and water stream into the cylindrical first portion 10 or in the conical second portion 16 in a manner such that the stream will start to spiral immediately. One tangential flow inlet 14 can be utilized; however, a plurality of tangential flow inlets 14 can be utilized in the same plane or in spaced relationship, as is desired. The flow inlet(s) 14 can have an elongated shape, such as a rectangle, oval or the like and the entry can be tangential or involute. The diameter (di) of the at least one tangential flow inlet 14 is sized for the desired flow rate in that a relatively larger diameter can handle higher flow rates; the smaller the diameter (di) means a decrease in flow rate capability, but it has been found that for smaller inlet sizes (di) the separation efficiency drops dramatically, as shown in FIG. 2.

The diameter of the cylindrical first portion 10 (Dc) should be small relative to the overall length of the hydrocyclone separator because with less surface area, higher spin velocities can be obtained to increase separation efficiency. If a relatively larger diameter (Dc) is utilized, it has been found that the separation efficiency drops dramatically.

The cylindrical first portion 10 can have an internal cone angle or taper the same as or less than the cone angle $\alpha$. For the purposes of the embodiment of the present invention, it is assumed that the cylindrical first portion 10 is preferably in the form of a right cylinder 0° taper). Further, it has been found that the length (Lc) of the cylindrical first portion 10 should be as short as possible because little separation actually occurs within the cylindrical first portion 10 and it is beneficial to reduce the frictional drag caused by its surface area. In fact, the cylindrical first portion 10 can be eliminated so that the inlet 14 is within the conical second portion 16. The ratios of Lc/Dc from 0 to approximately equal to 2.0 have been found to provide effective separation efficiency.

Figure 2:
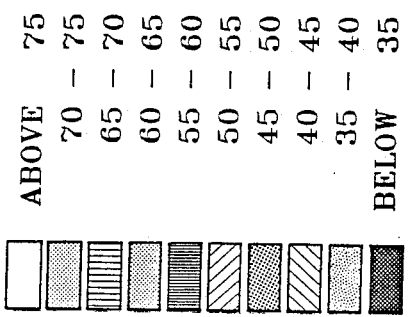
FIG. 2 is a three-axis graph showing oil separation efficiency of a hydrocyclone separator of the present invention versus changes in flow rate and inlet diameter (di).
Figure 2:
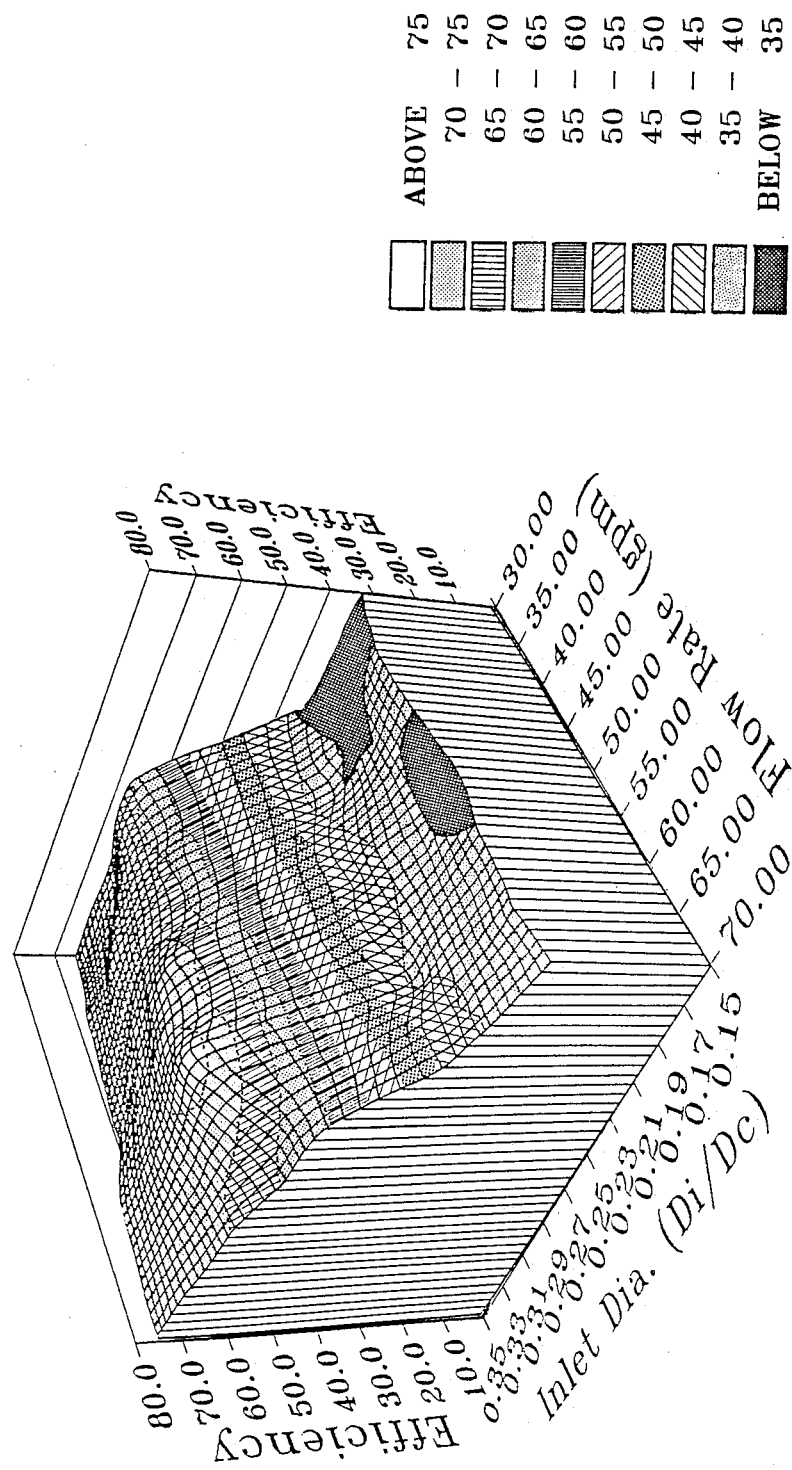

FIG. 2 shows the results of testing the effect of varying inlet diameter (di) for various flow rates. A hydrocyclone separator was constructed with Dc=3.0", Lc/Dc=1, Ls/Dc=18 and $\alpha$=6°. From 30 gpm to 70 gpm of water at 60° F. with 1,600 mg/liter of Bumpass crude oil, having a median size of 25 microns, was passed through the hydrocyclone separator and the ratio di/Dc was varied from about 0.15 to about 0.35. From the graph shown in FIG. 2, a separation efficiency of 70+% was achieved with $0.23 \leq di/Dc \leq 0.35$ for flow rates from about 50 gpm to about 65 gpm. The best separation efficiency 75+% was achieved with $0.24 \leq di/Dc \leq 0.28$ for flow rates from about 55 gpm to about 63 gpm.

The central overflow outlet 12 is usually a cylindrical opening in an upper panel 22 of the cylindrical first portion 10 or it can include what is commonly referred to as an oil-finding tube (vortex finder) 24 which extends part way into and coaxial with the cylindrical first portion 10. The diameter (do) of the oil-finding tube 24 and/or the opening 12 determines the flow split for a given backpressure of fluid (i.e., how much water comes with the separated oil). The smaller the diameter of the outlet 12 the less maximum amount of oil or separated gas is permitted to pass out from the overflow of the hydrocyclone separator. The larger the diameter of the overflow outlet 12, the greater the maximum amount of oil is removed. When less than the maximum amount of oil is separated out the overflow, water discharges out the overflow to replace the oil. For most applications, the ratio $0.1 \leq di/Dc \leq 0.4$ has been found to be satisfactory with $0.24 \leq di/Dc \leq 0.28$ being preferred. For most oil field applications with flow rates of between about 30 gpm to about 70 gpm and from about 2" to about 4" Dc, the overflow outlet diameter (do) can be from about 0.14" to about 0.05".

The flow of fluid exiting the first portion 10 enters the conical second portion 16 where the cone angle ($\alpha$) causes the fluid to spin more rapidly. The spin velocity increase results in greater forces on the oil droplets resulting in the droplets moving to the center and a separation being made. The transition from the first portion 10 to the second portion 16 can be an abrupt change from a cylinder to a cone if turbulence is minimized or the transition can be through a gradual slope change or curved/taper to facilitate the smooth spiralling flow of the fluid into and through the conical second portion 16. Through experimentation, it has been found that a substantially single cone angle throughout the entire length of the conical second portion 16 produces a preferable, relatively higher separation efficiency. Thus, there is no need for multiple angles, steps, and the like as preferred by the prior hydrocyclone separators. It is important that the angle ($\alpha$) be chosen so that the transition from cylindrical to conical (and back to cylindrical for entry into the third portion 18) obtains a satisfactory momentum transfer to increase the rotational speed of the introduced fluid and at the same time minimize the surface area. Thus, a relatively larger angle is desired in that it minimizes surface area; however, too large of an angle will not effect a smooth momentum transfer. While a relatively smaller angle does provide better separation efficiency, tco small of an angle causes the separation efficiency to drop off dramatically at higher flow rates because of the increase in surface area, thus causing drag and reduction of momentum.

Figure 3:
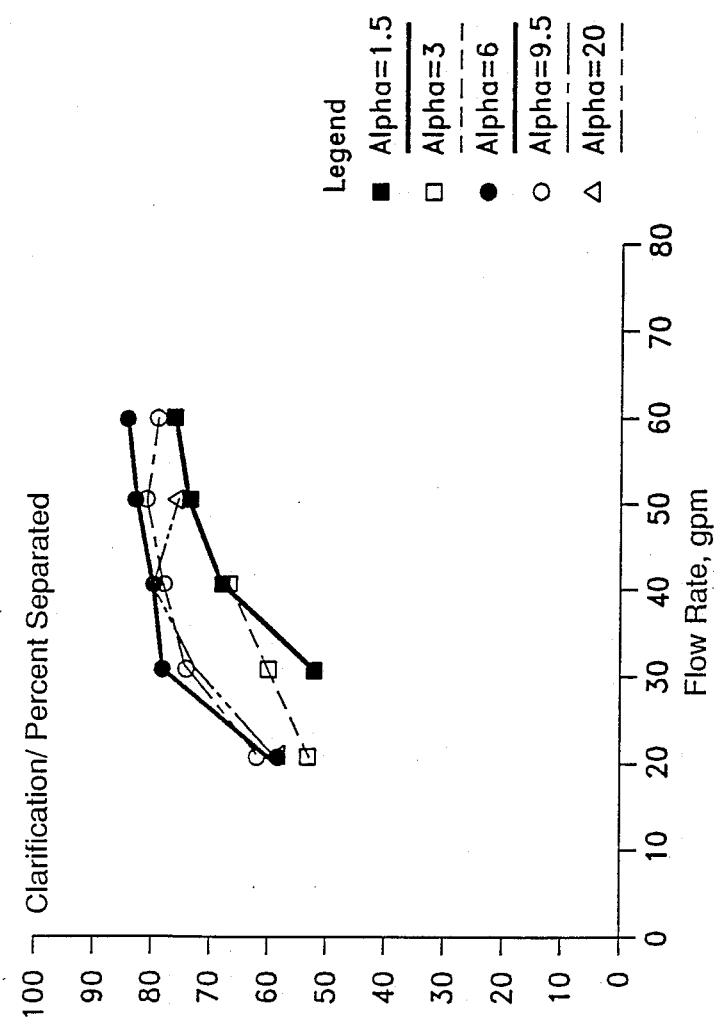
FIG. 3 is a graph showing oil separation efficiency of a hydrocyclone separator of the present invention versus changes in the cone angle ($\alpha$) and flow rate.

The cone angle ($\alpha$) can vary from about 0° to about 2° across the length of the conical second portion 16, but again, an essentially straight conical section is desired for ease of manufacture and as will be seen later better separation efficiency. FIG. 3 shows the effect of changes in flow rate (gpm) and cone angle ($\alpha$) on separation efficiency. Five hydrocyclone separators having $\alpha = 1.5°$, 3°, 6°, 9.5° and 20° were built with Dc=30", di/Dc=0.25, do=0.078", du/Dc=0.33, Lc/Dc=2 and Ls/Dc=12. The same fluid stream as used in the experiments of FIG. 2 was passed through the hydrocyclone separators at from about 20 gpm to about 60 gpm. From the results shown in FIG. 3, the greater the cone angle ($\alpha$), the separation efficiency tends to peak for lower flow rates then drop off dramatically. More specifically, the single optimum cone angle ($\alpha$) is approximately equal to 6°. This cone angle ($\alpha \cong 6°$) appears to provide the best balance of spin velocity and surface area for the usual ranges of flow rate (gpm). However, cone angles ($\alpha$) from about 3° to about 30° are preferred.

The substantially cylindrical third portion 18 is connected to or is formed part of the convergence with the second portion 16. It can have a slight internal angle of from about 0° to about 3°, but it is preferred that it will be in the form of a right cylinder (0° of taper). Further, the third portion 18 can include a bend or a curve to facilitate space saving in a particular implementation. However, it has been found, again, that maximum separation efficiency occurs when the cylindrical third portion 18 is in the form of a straight right cylinder.

Through various experiments, the length (Ls) of the cylindrical third portion 18 has been found to be very important in improving the separation efficiency. Too short of a third portion 18 reduces the separation efficiency because the fluid is spiralling as it enters the third portion 18 and if a longer third portion 18 is included, additional separation can occur therein before the spiraling motion dissipates. Beyond a certain length, no additional benefit occurs.

Figure 4:
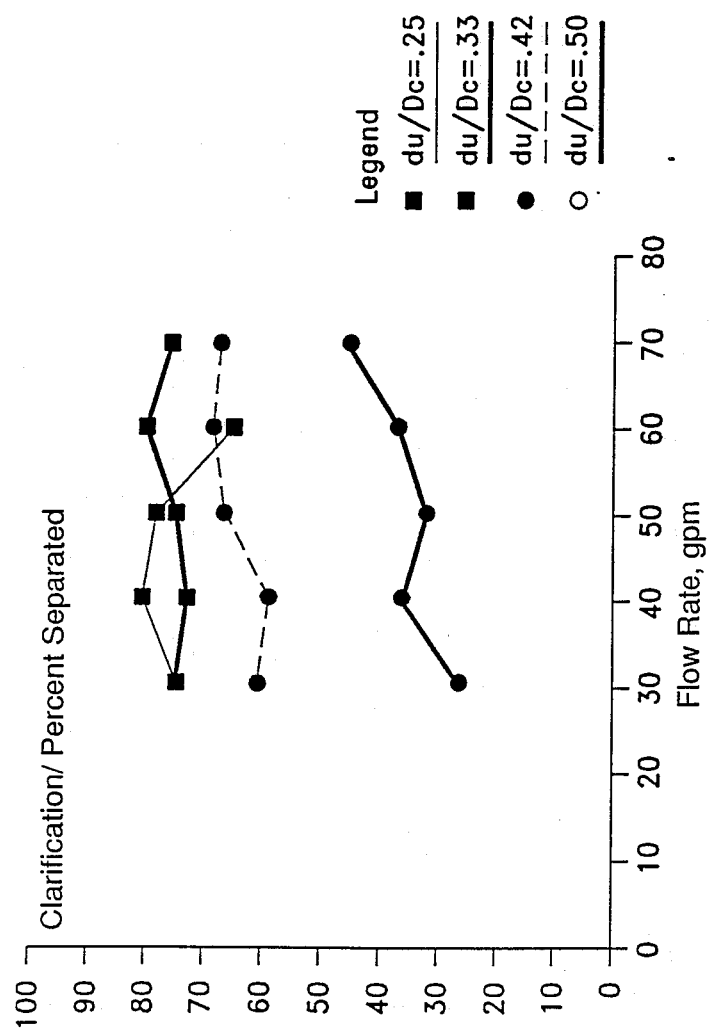
FIG. 4 is a graph showing oil separation efficiency of a hydrocyclone separator of the present invention versus changes in the underflow outlet (du) size.

Further, the diameter (du) of the underflow outlet 20 has been found to be important in relation to Dc because if too large of an underflow outlet 20 diameter (du) is used, then the spin velocity in this section is reduced resulting in poorer separation. Further, it should be understood that if the third portion 18 is in the form of a cylinder (with no taper) than the diameter (du) of the underflow outlet 20 will be the same as the average internal diameter of the third portion 18. To test the importance of du to Dc, four hydrocyclone separators were built with du/Dc=0.25, 0.33, 0.42 and 0.50. The other design parameters of the hydrocyclone separators were Dc=3.0 in., di/Dc=0.25, do=0.078, Ls/Dc=12, Lc/Dc=2 and $\alpha = 6°$. The same fluid stream used for the experiments of FIG. 2 was passed through the hydrocyclone separators at from about 30 gpm to about 70 gpm. The results shown in FIG. 4 show that a smaller diameter third portion 18 is desired to take advantage of the flow exiting the conical second portion 16. Through experiments, the ratios of $0.1 \leq du/Dc \leq 0.5$ have been found to provide adequate separation efficiency; however, ratios of $0.21 \leq du/Dc \leq 0.42$ have been found best over the given flow rates; du/Dc $\cong 0.33$ has been found to provide the best separation efficiency at the highest flow rates. High flow rate separation is desirable because fewer cone units then need to be used for a given total fluid treatment rate.

Figure 5:
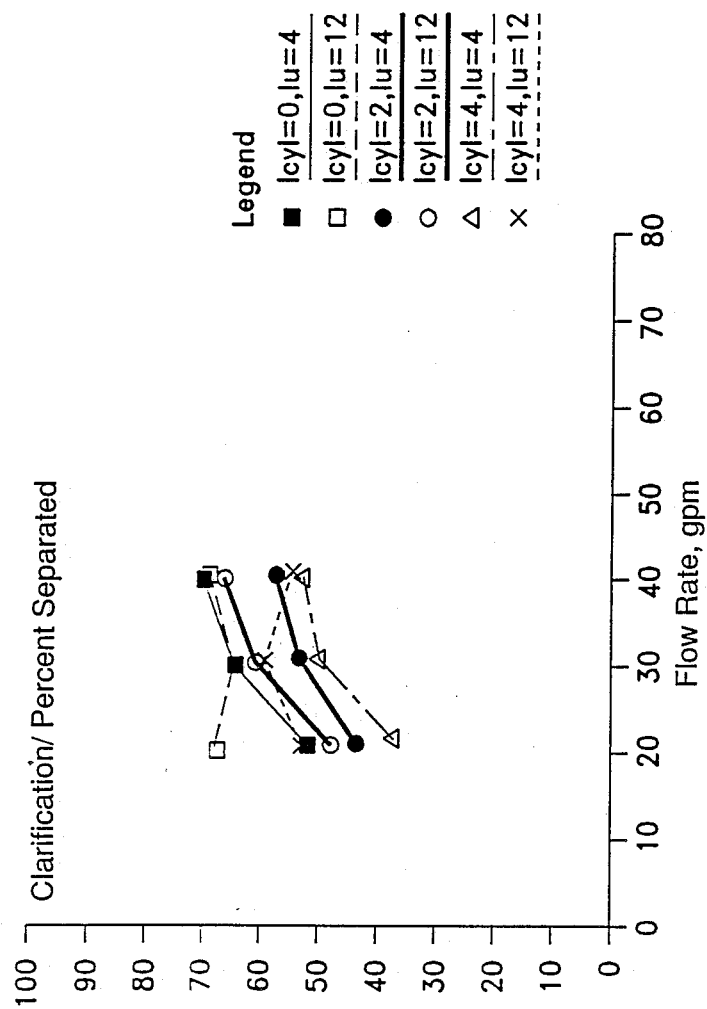
FIG. 5 is a graph showing oil separation efficiency of a hydrocyclone separator of the present invention versus changes in the first portion's length (Lc) and third portion's length (Ls).

The effects of changing the length (Ls) of the third portion 18 with respect to the length (Lc) of the first portion 10 was investigated. Three hydrocyclone separators were assembled having Lc=0 in., 2 in. and 4 in. and two different third portions were attached to each with Ls=4 in. and 12 in. The other design ratios were as follows Dc=3.0", di/Dc=0.15, do=0.078", du/Dc=0.33 and $\alpha = 3°$. The same fluid used in the experiments of FIG. 2 was passed through the hydrocyclone separators and from about 20 gpm to about 40 gpm. The results shown in FIG. 5 show that by comparing the same Lc to different Ls that the length (Ls) has a very strong influence on separation efficiency as previously described.

Figure 6:
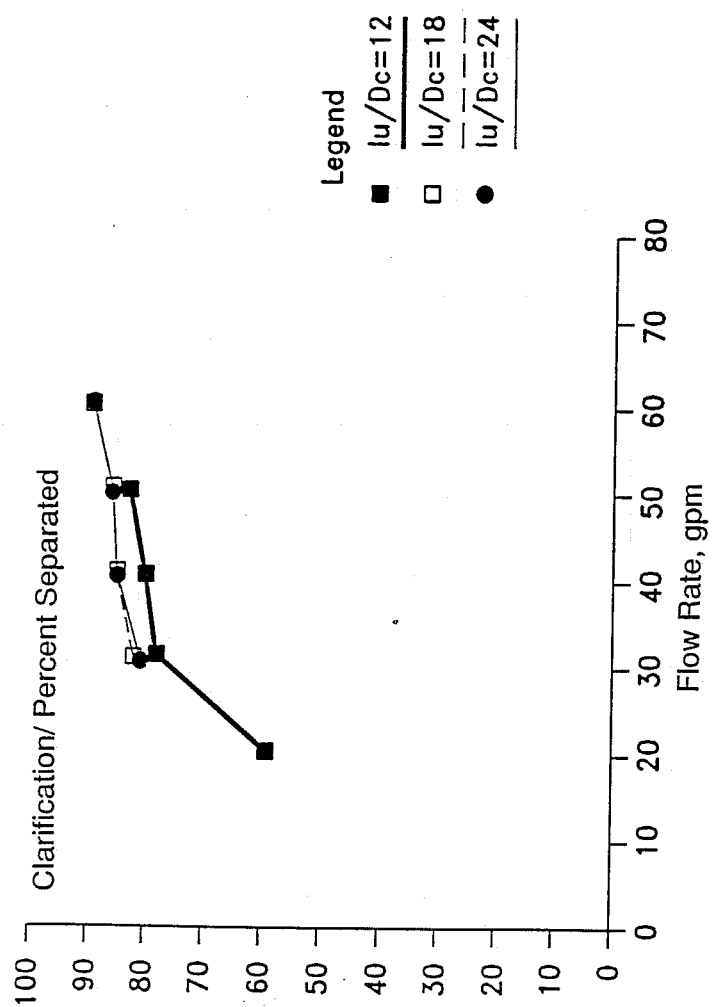
FIG. 6 is a graph showing oil separation efficiency of a hydrocyclone separator of the present invention versus changes in the third portion's length (Ls).

The effects of changing the length (Ls) of the third portion 18 with respect to the diameter (Dc) of the first portion 10 was investigated. A hydrocyclone separator was assembled having Ls/Dc=12, 18 and 24 with the following other design ratios: Dc=3.0", di/Dc=0.25, do=0.078", du/Dc=0.33, Lc/Dc=2 and $\alpha = 6°$. A fluid having a median size of 35 microns and an oil concentration of 1,000 mg/liter was passed through the hydrocyclone separator at from about 20 gpm to about 70 gpm. The results shown in FIG. 6 show that by merely increasing the length (Ls) of the third portion 18 on a 3 in. diameter cylinder from 36 in. to 72 in. that a separation efficiency of over 90% is achieved. It has been found that $9 \leq Ls/Dc$ provides satisfactory results; preferably Ls/Dc is from about 9 to about 27 and most preferably from about 12 to about 24. Tests have shown that for Dc equal to about 3 in., a length (Ls) of the third portion 18 above about 54 in. does not provide any additional separation benefit.

Tests were conducted to prove that the separation efficiency of a hydrocyclone separator made in accordance with the above-described ratios could have equal or exceed the oil separation efficiency of the best commercially available unit. A hydrocyclone manufactured and marketed by BWN Vortoil, Ltd., was purchased and measured to have the dimensions shown in FIG. 7.

Figure 7:
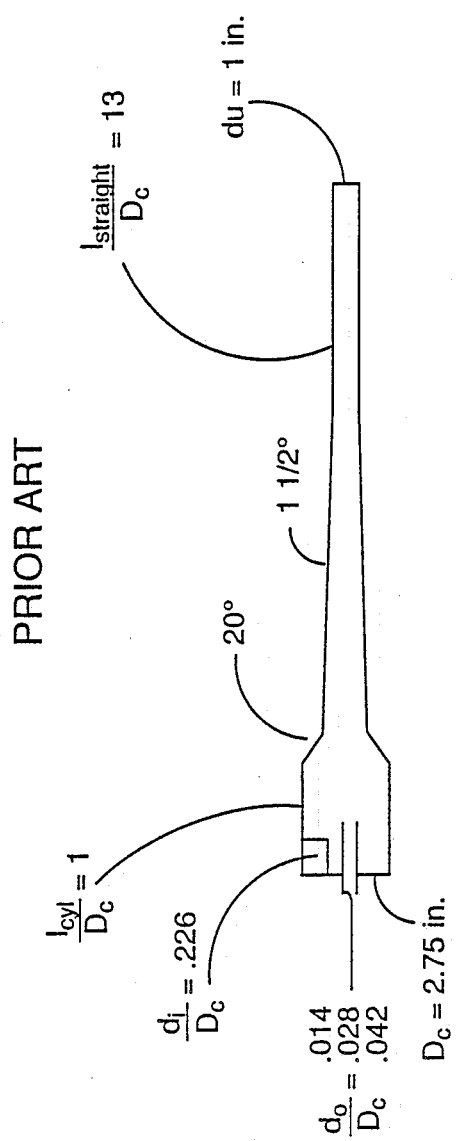
FIG. 7 is a cross-sectional side view of a commercially available hydrocyclone separator, and its design ratios.

One will note that several of the ratios of the hydrocyclone separator shown in FIG. 7 are within the possible ranges disclosed herein with regard to the hydrocyclone separator of the present invention. However, important differences were noted, specifically Ls was less than 36" for a 2.75" Dc and more importantly the hydrocyclone separator had two angled portions, one of 20° and a second of 1.5°, thereby increasing the surface area.

Figure 8:
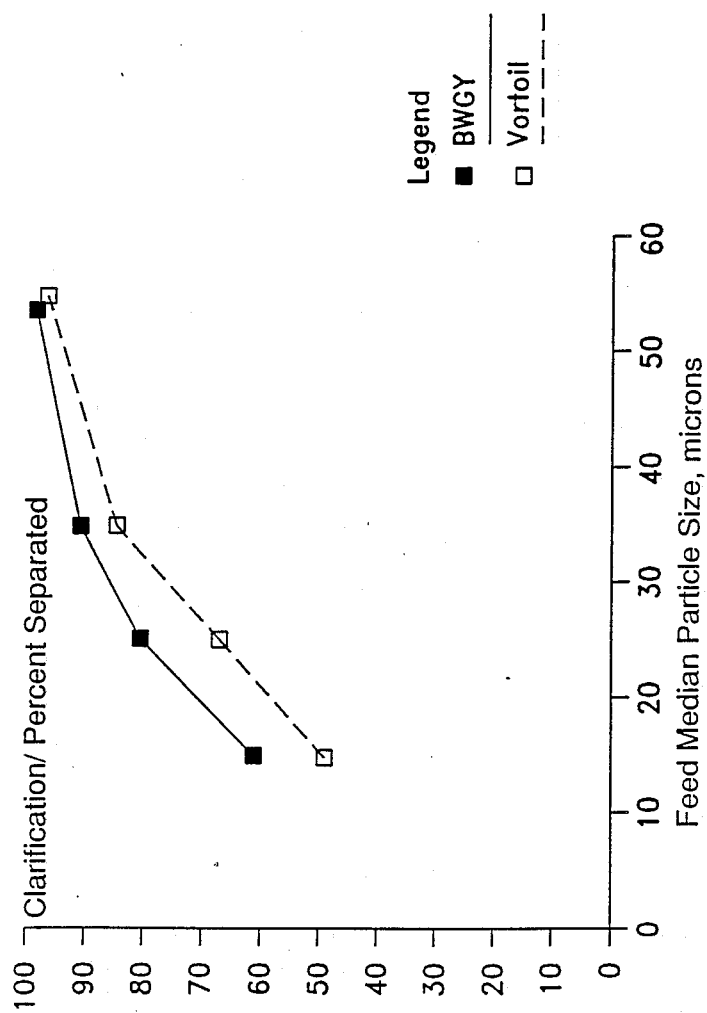
FIG. 8 is a graph showing oil separation efficiency versus mean oil droplet size distribution for a hydrocyclone separator of the present invention and for the commercially-available hydrocyclone separator of FIG. 7.

A hydrocyclone separator made in accordance with The present invention was assembled and had the following dimensions Dc=3.0", 0.25, do/Dc=0.028, Lc/Dc=1, $\alpha = 6°$, du/Dc=0.33 and Ls/Dc=18. A fluid stream of water with 1,000 mg/liter of Bumpass crude oil was passed through both hydrocyclone separators. Both the commercial and the hydrocyclone separator of the present invention exhibited excellent separation efficiency for slurries which had a median size of 55 microns achieving about 97.5% separation efficiency as shown in FIG. 8. However, as the oil droplet size decreased, the superior separation efficiency of the hydrocyclone separator of the present invention becomes obvious.

The inventors have found that a hydrocyclone separator can be designed in accordance with the above-described ratios/dimensions and for the typical oil from water separation process at the flow rates typically encountered in the offshore or onshore production of oil/gas, that a superior separation efficiency can be achieved.

Wherein the present invention has been described in particular relation to the drawings attached hereto, it should be understood that other and further modifications, apart from those shown or suggested herein, may be made within the scope and spirit of the present invention.

What is claimed is:

1. A hydrocyclone separator consisting essentially of:
    a substantially cylindrical first portion having a central overflow outlet at a first end and having at least one tangential flow inlet adjacent the first end, and directly connected at a second end to a conical second portion;
    the conical second portion having essentially a single cone angle and directly connected at an end opposite the cylindrical first portion to a cylindrical third portion;
    the cylindrical third portion having a central overflow outlet at an end opposite the conical second portion;
    the internal diameter of the cylindrical first portion being $Dc$; the diameter of a circle having the same area as the least one tangential flow inlet, regardless of shape, being $di$; the internal diameter of the central overflow outlet being $do$, the internal length of the cylindrical first portion being $Lc$, the cone angle of the conical second portion being $\alpha$, the internal length of the cylindrical third portion being $Ls$, and the internal diameter of the underflow outlet being $du$; and
    the configuration of the hydrocyclone separator being in accordance with the following relationships:

$do < du < Dc$ $0.1 < di/Dc \times 0.04$ $0.01 \leq do/Dc \leq 0.06$ $0 \leq Lc/Dc \approx 2.0$ $3° \leq \alpha \leq 30°$ $0.1 \leq du/Dc \leq 0.5$ $9 \leq Ls/Dc.$ 2. A hydrocyclone separator of claim 1 wherein $0.23 \leq di/Dc \leq 35$.

3. A hydrocyclone separator of claim 2 wherein $0.24 \leq di/Dc \leq 0.28$.

4. A hydrocyclone separator of claim 1 wherein $0.014 \leq do \leq 0.05$.

5. A hydrocyclone separator of claim 1 wherein $\alpha \approx 6°$.

6. A hydrocyclone separator of claim 1 wherein $0.21 \leq du/Dc \leq 0.42$.

7. A hydrocyclone separator of claim 1 wherein $Ls/Dc$ is between about 9 and about 27.

8. A hydrocyclone separator of claim 7 wherein $Ls/Dc$ is between about 12 and about 24.

* * * * *

UNITED STATES PATENT AND TRADEMARK OFFICE
CERTIFICATE OF CORRECTION

PATENT NO. : 4,964,994

DATED : October 23, 1990

INVENTOR(S) : WAKLEY, ET AL

It is certified that error appears in the above--identified patent and that said Letters Patent is hereby corrected as shown below:

Column 2, line 60, after "ally" delete --10--.

Column 3, line 27, after "flow" insert --outlet 12 is labeled do, the internal length of the--.

Column 3, line 60, after "cylinder" insert --(--.

Column 4, line 39, "0.14" should read --.014--.

Column 4, line 66, "tco" should read --too--.

Column 5, line 19, "(a $\cong$ 66°)" should read --(a $\cong$ 6°)--.

Column 6, line 51, "The" should read --the--.

Column 6, line 52, before "0.25" insert --di/Dc=--.
Column 7, line 18:
Claim 1, line 7, after "the" insert --at--.
Column 8, line 9:
Claim 1, second relationship, "0.1 < di/DcX0.04" should read --0.1$\leq$ di/Dc $\leq$ 0.4--

Signed and Sealed this

Third Day of November, 1992

*Attest:*

DOUGLAS B. COMER

*Attesting Officer*     *Acting Commissioner of Patents and Trademarks*